United States Patent
Scott et al.

[11] Patent Number: 5,967,258
[45] Date of Patent: Oct. 19, 1999

[54] GUARDRAIL ASSEMBLY

[75] Inventors: Jay G. Scott, DeWinton; Larry Dobson, Calgary, both of Canada

[73] Assignee: Mobilift Inc., Calagary, Canada

[21] Appl. No.: 08/868,811

[22] Filed: Jun. 4, 1997

[51] Int. Cl.[6] ................................. A47L 3/02
[52] U.S. Cl. ................. 182/113; 182/112; 182/152; 182/163; 256/59
[58] Field of Search .................. 182/112, 113, 182/146, 149, 152, 163; 256/59, 67, DIG. 2, DIG. 6

[56] References Cited

U.S. PATENT DOCUMENTS

| | | | |
|---|---|---|---|
| 2,674,500 | 4/1954 | Hukari | 182/113 |
| 2,678,243 | 5/1954 | Masse | 182/113 |
| 2,753,224 | 7/1956 | Troche et al. | 182/113 |
| 3,072,215 | 1/1963 | Rush | 182/113 |
| 3,082,843 | 3/1963 | Leonard | 182/113 |
| 3,231,043 | 1/1966 | Brown | 182/113 |
| 3,429,398 | 2/1969 | Reynolds et al. | 182/152 |
| 4,090,585 | 5/1978 | Laub | 182/113 X |
| 4,475,625 | 10/1984 | Clements | 182/113 |
| 4,936,407 | 6/1990 | Brock et al. | 182/113 X |
| 4,972,924 | 11/1990 | Nielsen | 182/152 |
| 4,979,725 | 12/1990 | Hutchings, II et al. | 256/59 X |
| 5,099,953 | 3/1992 | Stegath | 182/152 |
| 5,237,932 | 8/1993 | Edwards | 182/113 X |
| 5,547,169 | 8/1996 | Russell | 256/59 X |
| 5,711,398 | 1/1998 | Bartholomew | 256/59 X |
| 5,749,436 | 5/1998 | Satchwell, III | 182/113 X |

*Primary Examiner*—Daniel P. Stodola
*Assistant Examiner*—Bruce A. Lev
*Attorney, Agent, or Firm*—George A. Seaby

[57] ABSTRACT

A guardrail assembly for use on an elevated work platform includes a plurality of pivotally interconnected rail sections mounted on each side of the open front end of the work platform for movement between a collapsed position against the sides of the platform and an extended position. In the extended position, the sections define an enclosure on an elevated work surface, e.g. the top of a railcar or the wing of an airplane, and latches releasably lock outer free ends of the rail sections together. Vertically movable feet on the sections stabilize the assembly on the work surface.

12 Claims, 13 Drawing Sheets

GUARDRAIL ASSEMBLY

BACKGROUND OF THE INVENTION

1. Field of the Invention

This invention relates to a work platform and guardrail assembly for use when working on an elevated surface.

In general, when work is required on an elevated work surface such as the roof of a rail car, access to the roof is gained by means of an elevated platform. The safety laws in most jurisdictions stipulate a worker on an elevated surface with unprotected sides or edges must be protected from falling by guard rails, safety nets or a personal fall arrester.

2. Discussions of the Prior Art

Existing guardrail apparatuses for meeting these needs tend to be somewhat complicated, and consequently expensive to produce or lacking in versatility, i.e. mobility. In this connection, reference is made to U.S. Pat. Nos. 4,679,657 and 5,392,878 which issued to Ronald W. Bennett et al on Jul. 14, 1987 and Feb. 28, 1995, respectively. Both of the Bennett et al patents disclose platform structures for use on elevated surfaces (the tops of tanker trucks) which are massive and fixed in one position. In one case, a railing structure or fence for use on the top of tanks is swung between retracted and extended or use positions by means of a winch system. In the other case, a fence assembly is slid between the retracted and extended positions using rollers and fluid actuated cylinders. In both cases, the structures are bulky and utilize fixed frameworks, which require movement of the vehicle into close proximity to the structures.

Another apparatus which can be used for work on elevated work surfaces is described in U.S. Pat. No. 4,518,059, which issued to Paul Frey-Wigger on May 21, 1985. The Frey-Wigger apparatus includes a collapsible platform mounted on the free end of the boom of a crane. However, the platform of the Frey-Wigger apparatus is relatively small, and thus it is necessary to move the entire platform often when working on a large work surface such as the top of a railcar.

GENERAL DESCRIPTION OF THE INVENTION

The object of the present invention is to avoid the drawbacks of existing devices by providing a relatively simple guardrail and work platform assembly in conjunction with an elevated work platform which (a) permits movement of a small platform into position adjacent to an elevated work surface and simple movement of the guardrail assembly into a position surrounding a relatively large work surface, e.g. a substantial portion of the top of a railcar, and (b) is collapsible, relatively simple and easy to produce.

Accordingly, the present invention relates to a work platform and guardrail assembly for work on an elevated work surface comprising a platform for movement into position adjacent an elevated work surface, said platform including a railing therearound and an opening in one side of the railing permitting access to the elevated work surface from said one side of the platform; a plurality of rail sections pivotally connected to the platform railing on each side of said opening and to each other for movement from a collapsed position against opposed sides of the platform railing and an extended position defining a portion of a guardrail assembly around said work surface, each said rail section having a free and remote from the platform when the sections are in the extended position; and first latch means for releasably interconnecting the free ends of the rail sections in the extended position to define a temporary safety enclosure around the work surface.

BRIEF DESCRIPTION OF THE DRAWINGS

The invention is described in greater detail hereinafter with reference to the accompanying drawings, which illustrate a preferred embodiment of the invention, and wherein.

DESCRIPTION OF THE PREFERRED EMBODIMENT

Figure 1:
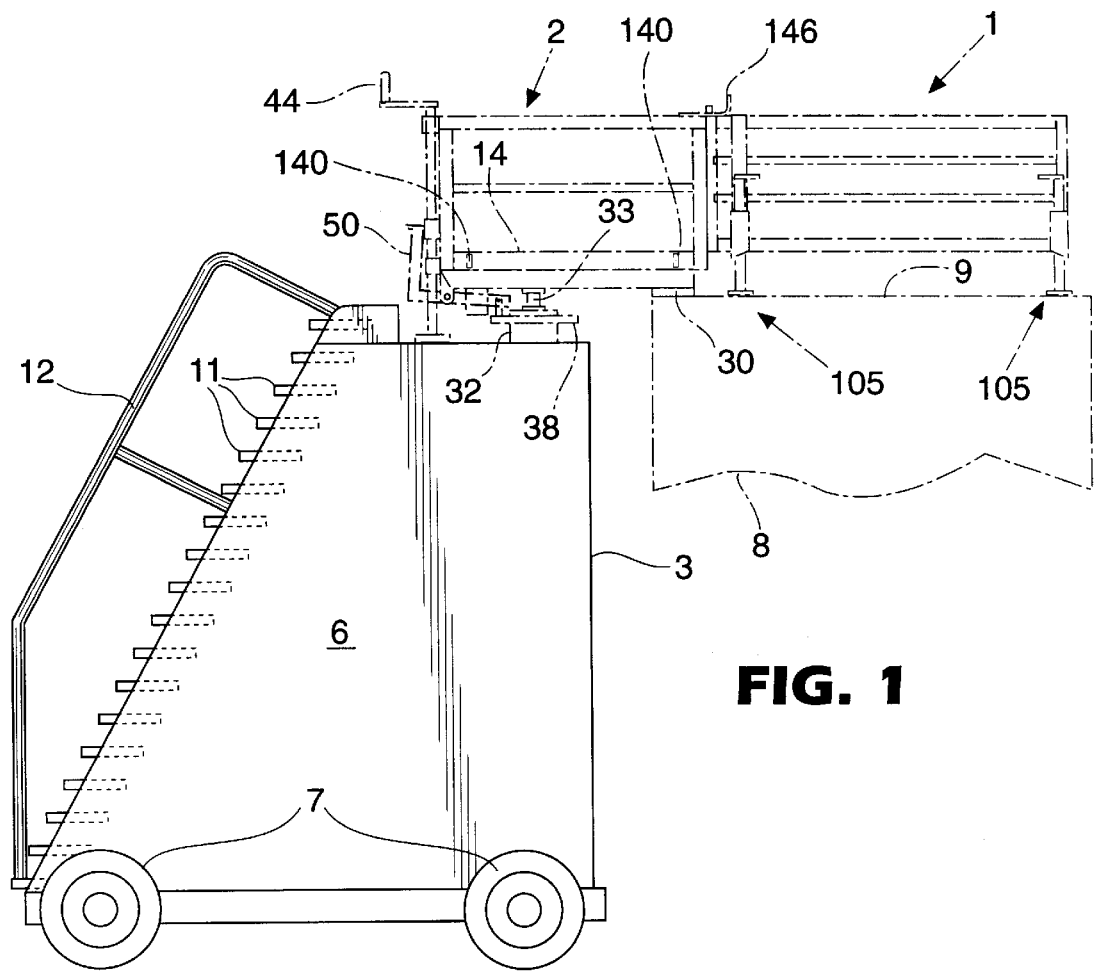
FIG. 1 is a side view of a work platform and guardrail assembly in accordance with the present invention.
Figure 2:
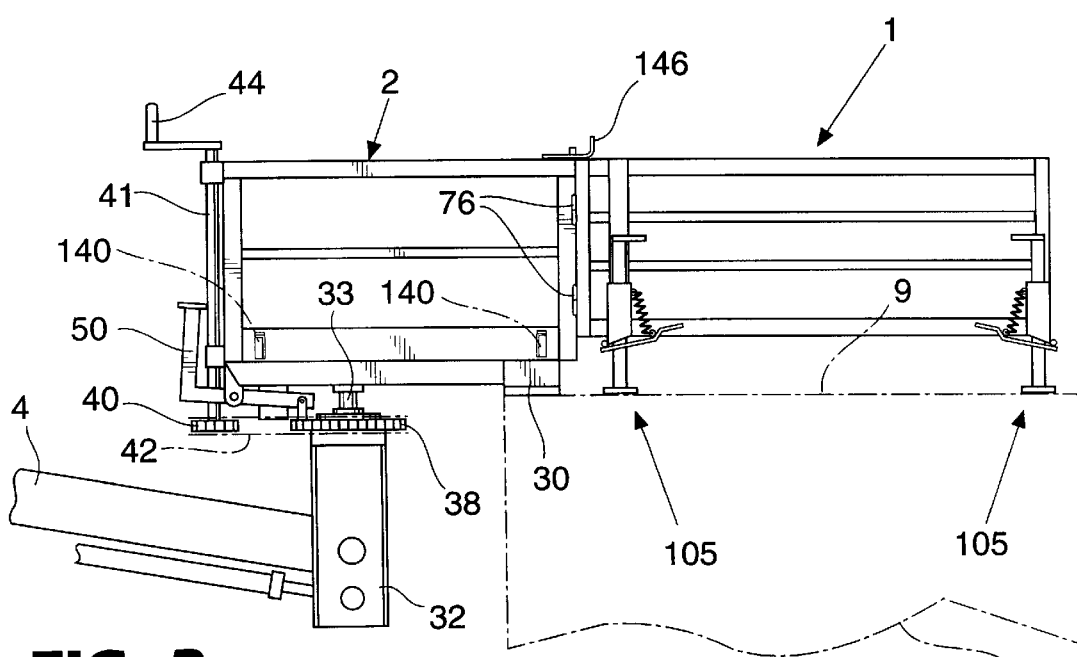
FIG. 2 is a side view of the work platform and the guardrail assembly of FIG. 1, mounted on a boom.
Figure 3:
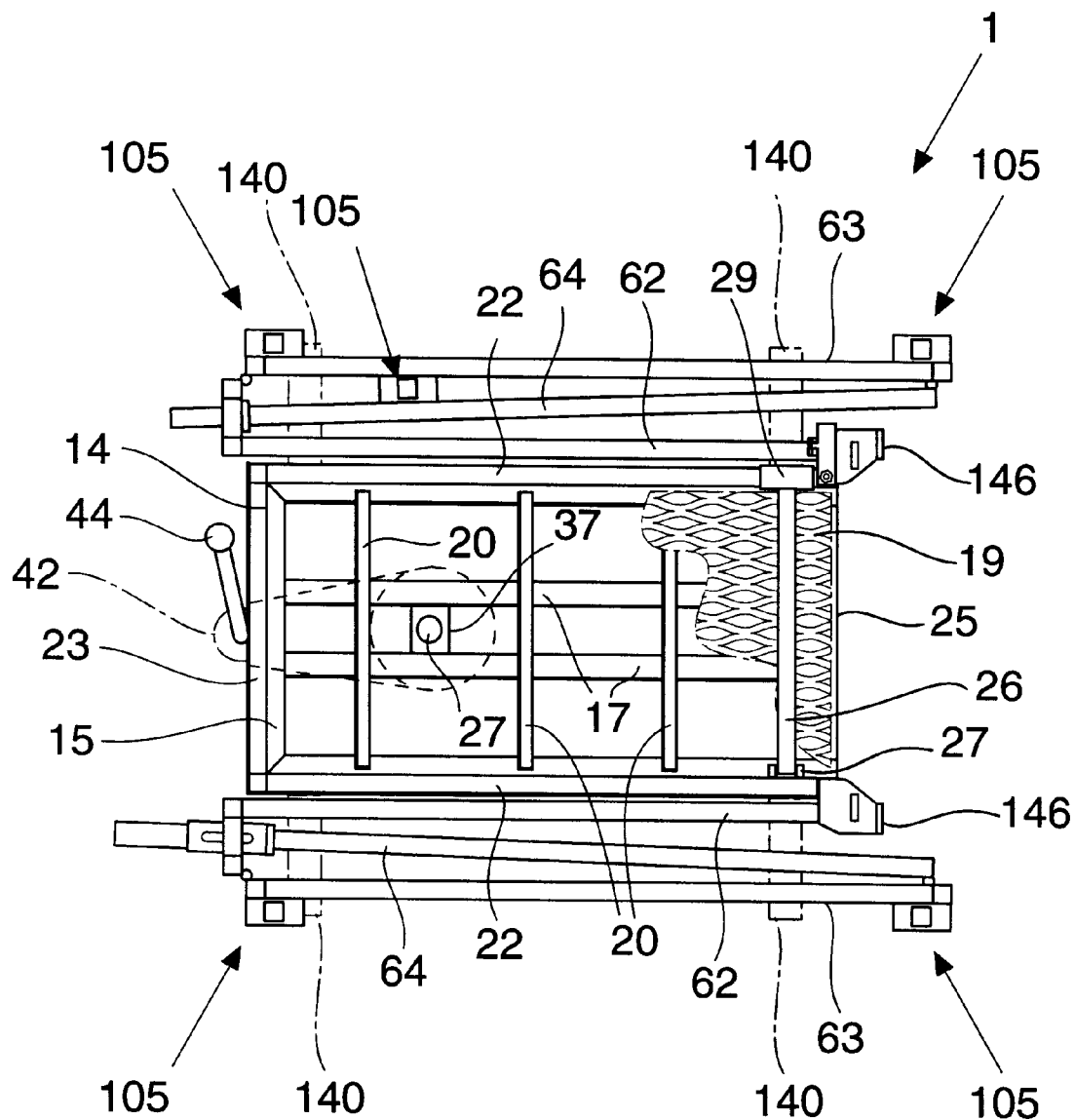
FIG. 3 is a plan view of the guardrail assembly of FIGS. 1 and 2 in the collapsed, non-use position.

Referring to FIGS. 1 to 3, the guardrail assembly of the present invention which is generally indicated at 1, is intended for use on an elevated work platform generally indicated at 2. The platform 2 is mounted on a mobile dolly 3 (FIG. 1) or on the outer free end of a boom 4 (FIG. 2).

The dolly 3 is in the form of a large platform 6 supported by wheels 7 for movement to a work position. In FIG. 1, the dolly 3 is located adjacent to a railcar 8, and the rail assembly 1 is used to provide a guardrail around a work area on the roof 9 of the railcar 8. A set of stairs 11 and a railing 12 are provided on one side of the dolly 3, facilitating access to the platform 2.

The boom 4 is part of a conventional aerial lift assembly of the type disclosed, for example in Canadian Patents Nos. 997,686, issued to John L. Grove on Sep. 28, 1976 and 2,055,864, issued to Howard W. S. Derksen et al on Jul. 25, 1995, and U.S. Pat. Nos. 2,998,861, issued to E. A. Hotchkiss on Sep. 5, 1961 and 3,709,322, issued to Maurice E. Mitchell on Jan. 9, 1973.

The platform 2 includes a base 14 defined by a rectangular frame 15 (FIG. 3) supported by a pair of longitudinally extending angle irons 17 bordering the center of the frame 15. The frame 15 carries a metal mesh defining a floor 19, which is supported by crossbars 20 extending between the sides of the frame 15. Railings 22 and 23 are provided on the sides and the rear end, respectively of the base 14 of the platform 2. Thus, the front end 25 of the platform 2 is open so that a user can enter and exit the platform. The open front end 25 of the platform 2 is normally closed by a gate 26 in the form of a bar pivotally connected by a clevis 27 to the top of one side railing 22. An inverted U-shaped hook 29 (FIGS. 3 and 17) on the other end of the gate 26 releasably engages the top of the other side railing of the platform 2 when the gate is closed. A pair of feet 30 (FIGS. 1, 2 and 9) at the front end of the frame 15 support such front end on the roof 9 of the railcar 8.

In each case, i.e. when located on a dolly 3 or on a boom 4, the platform is mounted on the top end of a vertical post 32 for rotation around the vertical, longitudinal axis of the post. For such purpose, the platform 2 is mounted on the top end of shaft 33, which is rotatable in a bearing 34 (FIG. 4) on the top end of the post 32. The top end of the shaft 33 is retained in a sleeve 35 extending downwardly from a plate 37 (FIG. 3) connecting the angle irons 17. A large sprocket 38, with a hole therethrough for rotatably receiving the shaft 33, is fixedly mounted on the top end of the post 32. The sprocket 38 is connected to a smaller sprocket 40 at the bottom end of a drive shaft 41 by a chain 42. The shaft 41 is rotatably mounted in brackets 43 on the closed end of the platform 2, and a handle 44 is provided on the top end thereof for manual rotation of the shaft 41 to turn the sprocket 40. Rotation of the sprocket 40 causes the chain 42 to travel around the large, fixed sprocket 38. Thus, the sprocket 40 and the platform 2 are, in effect, walked around the vertical axis of the shaft 33. In this manner, the platform 2 can be rotated around the better part of 360°.

Figure 5:
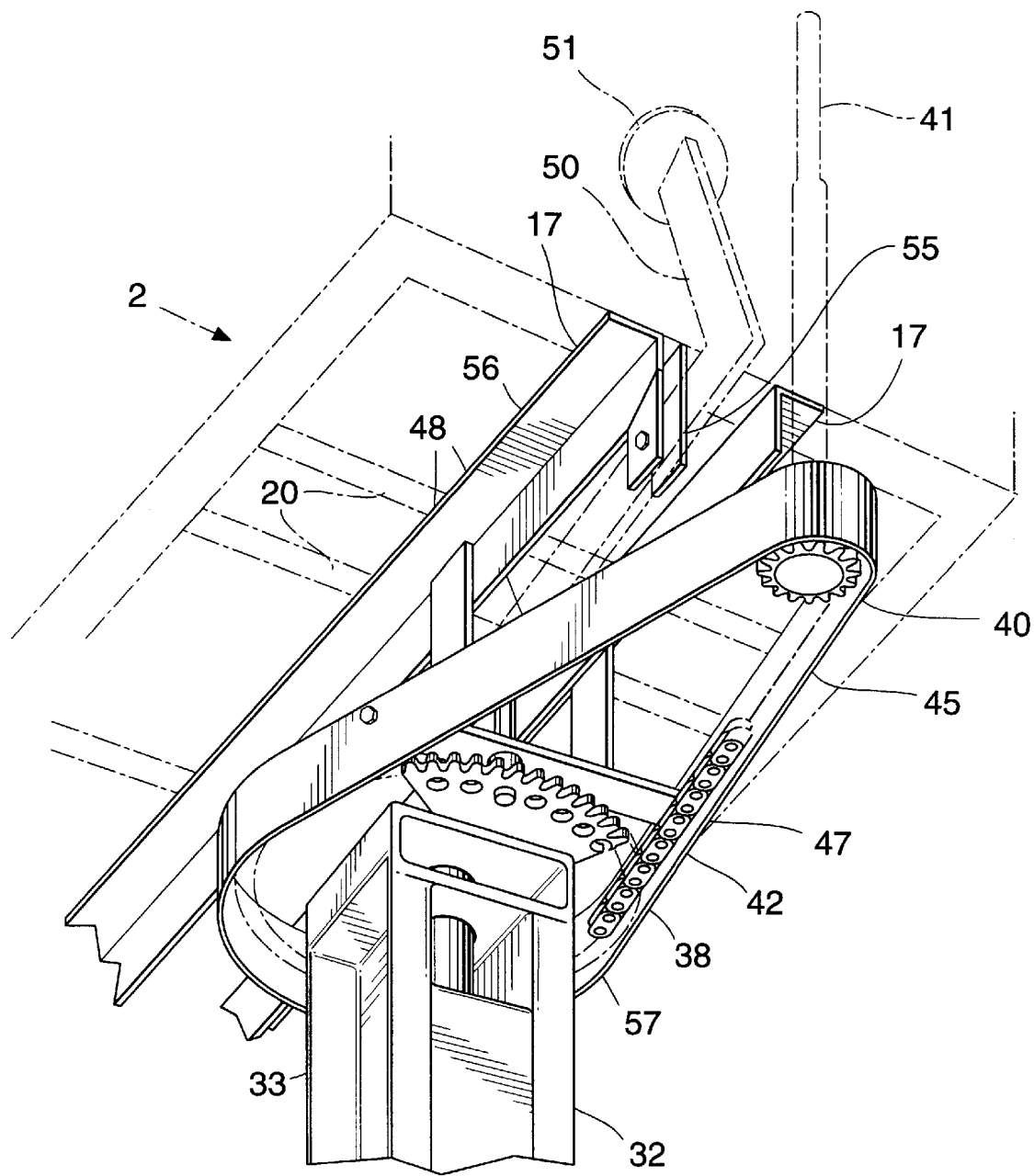
FIG. 5 is an isometric view from below of the platform and rotating mechanism of FIG. 4.

As best shown in FIG. 5, the sprockets 38 and 40, and the chain 42 are surrounded by a generally drop-shaped (when viewed from above or below) guard 45. The guard 45 is connected to the base 14 of the platform 2 by a crossbar 47 extending between the sides of the guard 45 and hangers 48, which connect the crossbar 47 to the angle irons 17.

Figure 4:
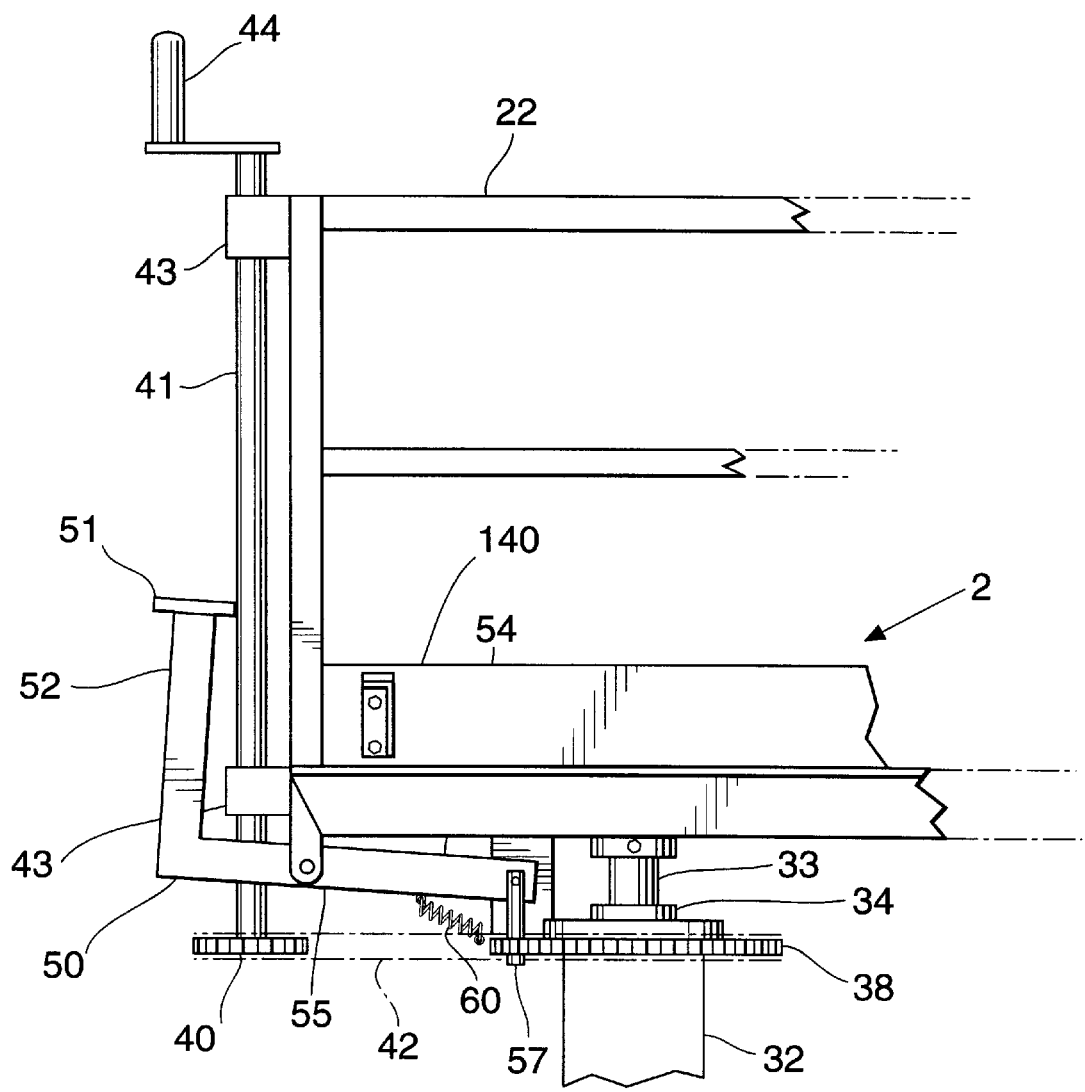
FIG. 4 is a side view of one end of the platform of FIGS. 1 and 2 and a mechanism for rotating the platform.

With reference to FIGS. 4 and 5, the platform 2 is releasably locked in position by a latch mechanism including a foot operated, generally L-shaped lever 50 with a disc-shaped pedal 51 on the upper end of a vertical arm 52 thereof. The other, horizontal arm 54 of the lever 50 is pivotally mounted on a bolt 55 in a clevis 56 extending downwardly from the closed end of the platform 2. A pin 57 connected to the free end of the horizontal arm 54 of the lever 50 normally rests in one of a plurality of holes 58 (FIG. 5) arranged in a circle in the large sprocket 38. A spring 60 (FIG. 4) extending between the arm 54 of the lever 50 and the bottom of one of the hangers 48 biases the free end of the arm 54 and consequently the pin 57 downwardly.

When an operator steps on the pedal 51 and applies downward pressure, the lever 50 pivots around the longitudinal axis of the bolt 55 to move the pin 57 upwardly which releases the platform 2 from the sprocket 38. By manually rotating the handle 44 and the shaft 41, the platform 2 is caused to rotate around the longitudinal axis of the post 32, so that the platform 2 can be properly positioned with respect to the roof 9 of the railcar 8 (or any other work surface). When the lever 50 is released, the spring 60 biases lever arm 51 downwardly to return the pin 57 to one of the holes 58 in the large sprocket 38.

Figure 6:
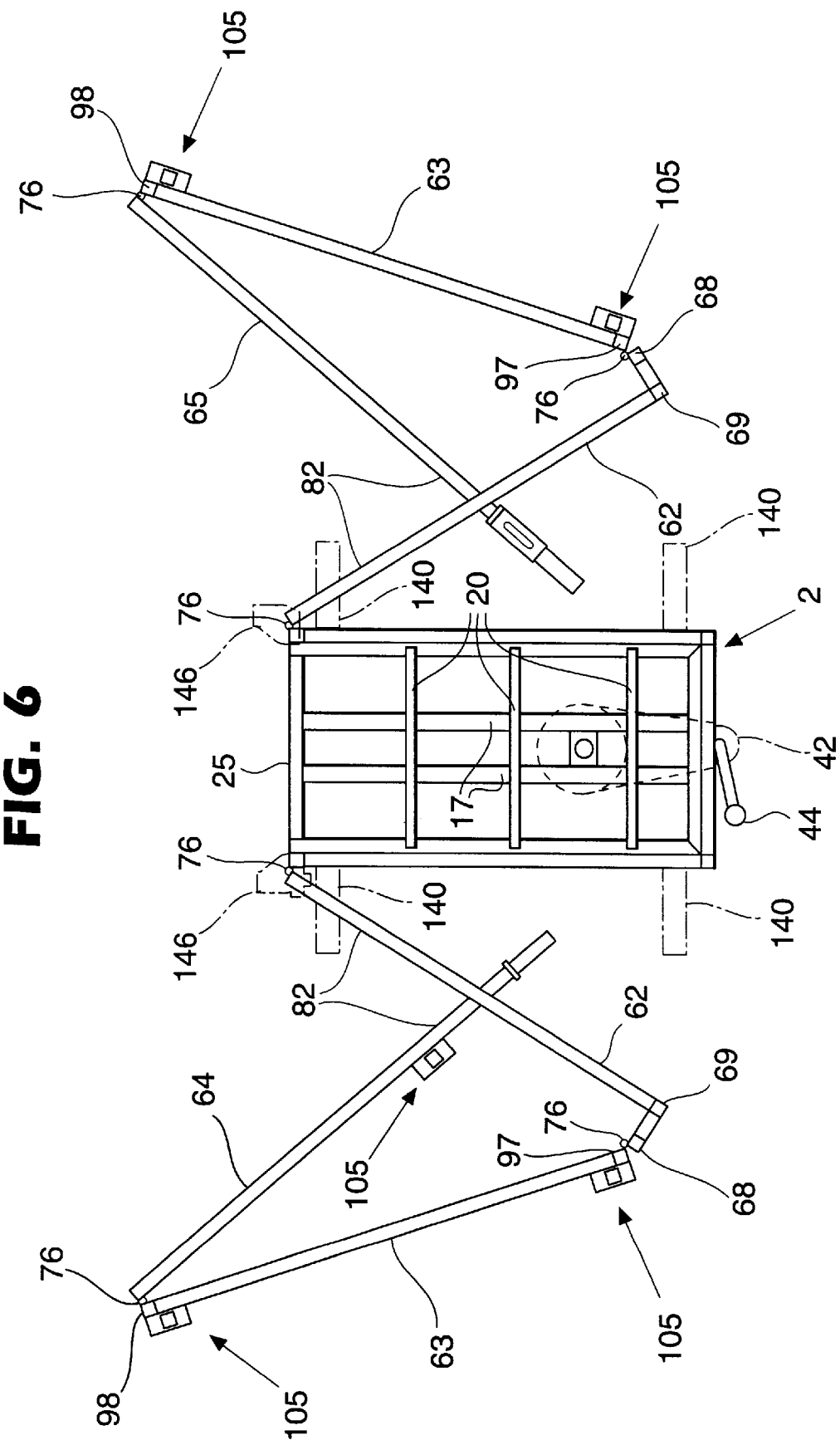
FIGS. 6, 7 and 8 are plan views of the guardrail assembly of FIGS. 1 to 3 in a variety of extended positions.
Figure 7:
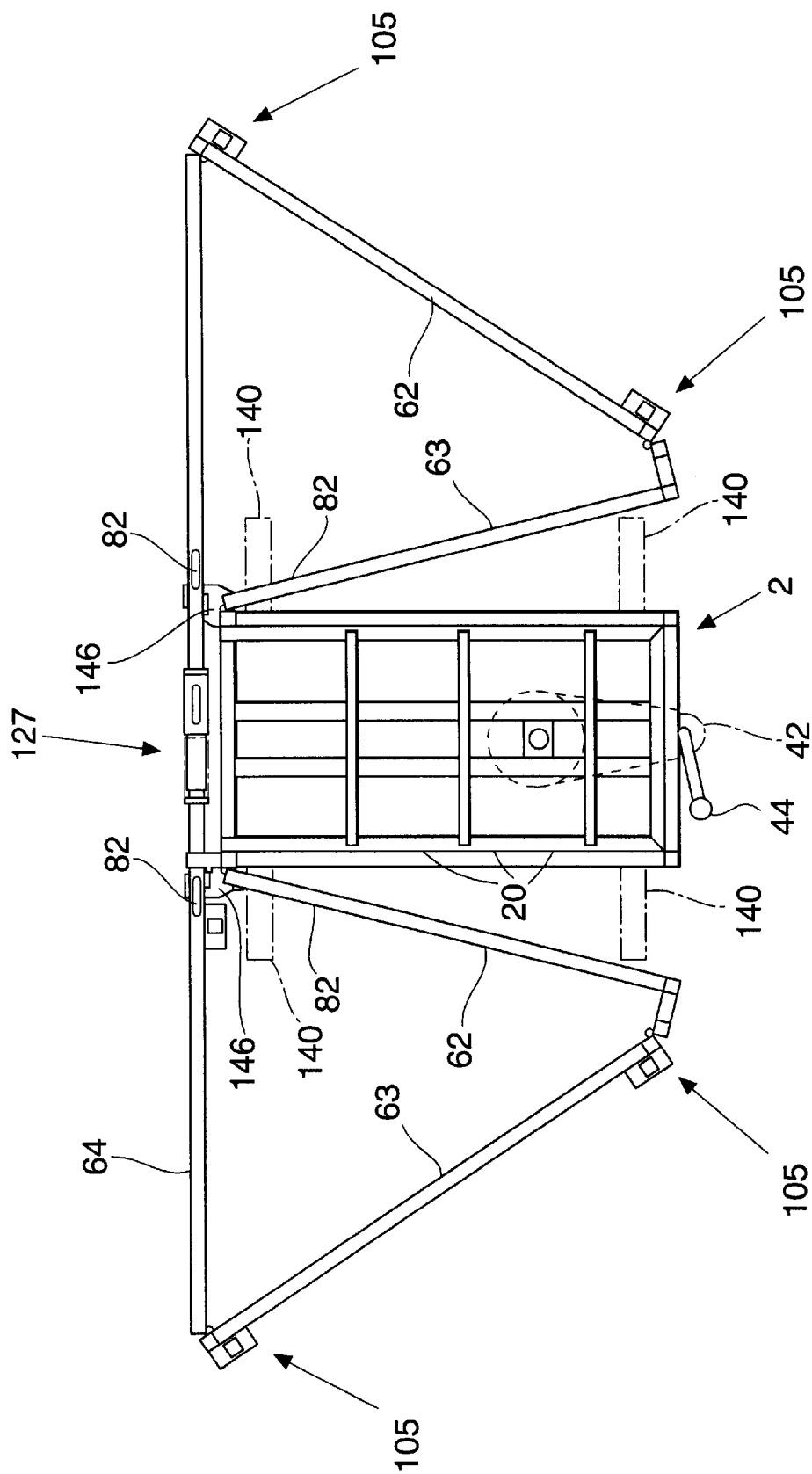
Figure 8:
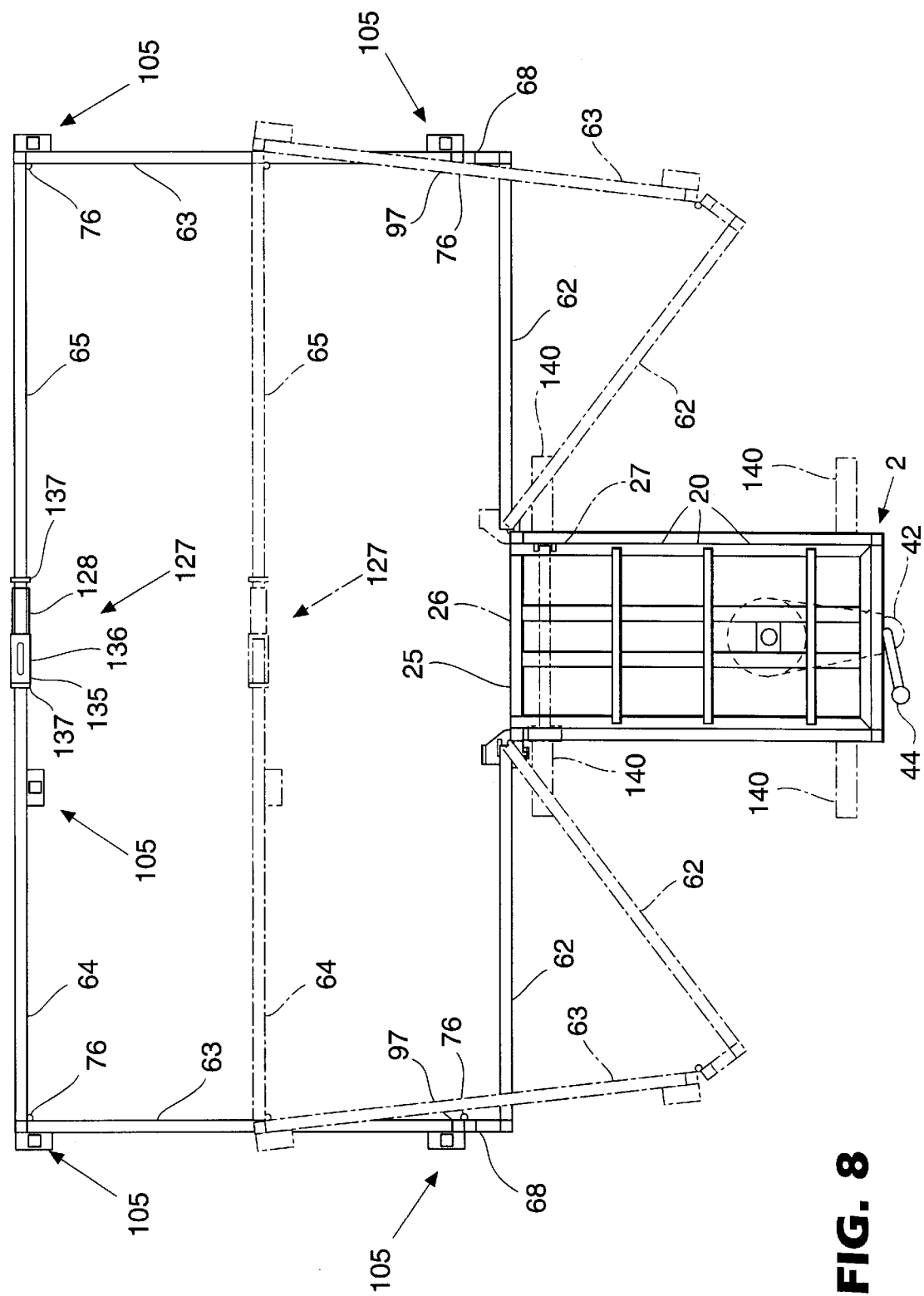

Referring to FIGS. 6 to 8, the guardrail assembly 1 of the present invention is defined by three pivotally interconnected rail sections generally indicated at 62, 63 and 64 connected to one side railing 22 at the platform 2, and three similar sections generally indicated at 62, 63 and 65 connected to the other side of the platform 2. The sections 62 and 63 on one side are identical to the liked numbered sections on the other side, and accordingly only one of each different section is described in detail. The other rail sections 64 and 65 are virtually identical, except for the locations of elements of latch assemblies described in greater detail hereinafter.

Figure 9:
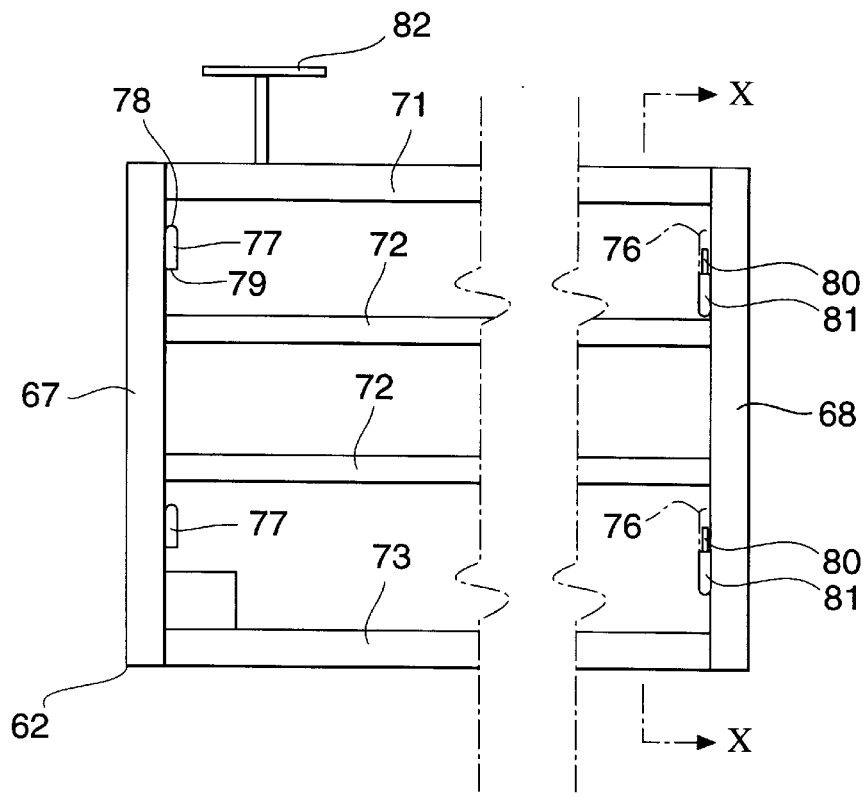
FIG. 9 is a front view of a rail section used in the assembly of FIGS. 1 to 3.
Figure 10:
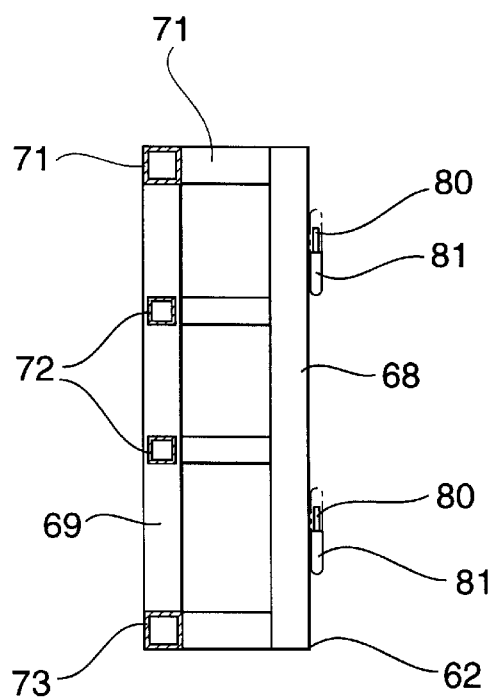
FIG. 10 is a cross section taken generally along line X—X of FIG. 9.
Figure 11:
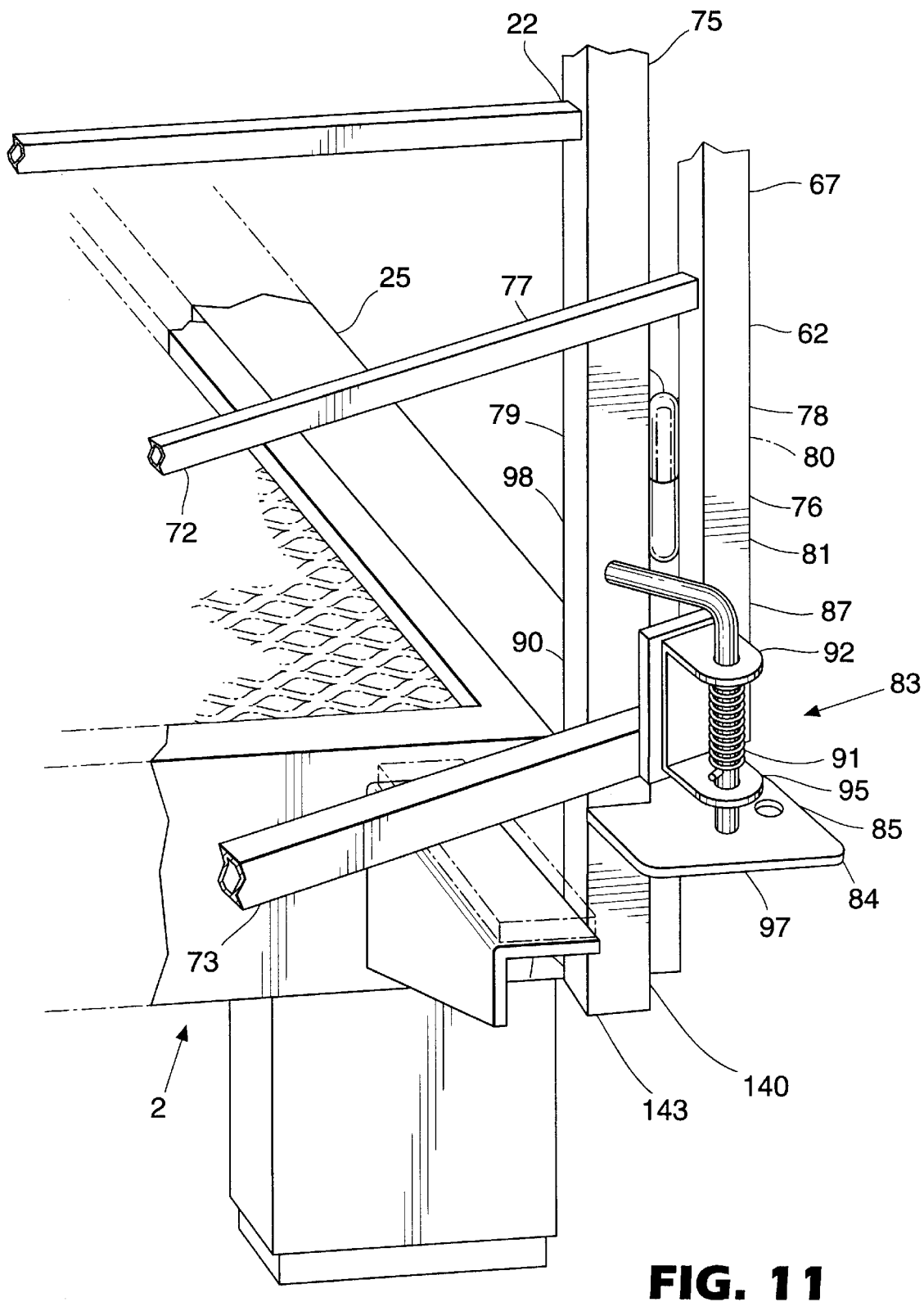
FIG. 11 is an isometric view of the guardrail assembly and one corner of the work platform of FIGS. 1 to 3 and a latch mechanism.

As best shown in FIGS. 10 and 11, each innermost rail section 62 of the guardrail assembly is generally L-shaped when viewed from above or below, and includes a pair of end posts 67 and 68 and a corner post 69 interconnected by top, intermediate and bottom rails 71, 72 and 73 respectively. One end post 67 is pivotally connected to a post 75 defining the front end of one side 22 of the platform 2 by hinges 76. Each hinge 76 (FIGS. 9 to 17) is defined by a tubular socket 77 with a closed top end 78 and an open bottom end 79 for receiving a pin 80 extending upwardly from and integral with a cylindrical body 81. The socket 77 is welded to the post 67, of the railing section 62 and the body 81 carrying the pin 80 is welded to the post 75 of the platform 2. All of the hinges 76 interconnecting all of the various railing sections are identical, and accordingly are identified by the same reference numeral.

As best shown in FIG. 9, the innermost railing sections 62 are releasably locked in the fully open or extended position (FIG. 9,) by a pair of latches generally indicated at 83. Each latch 83 includes a bottom plate 84 extending outwardly from the front corner of the bottom end of the platform 2. A hole 85 in the plate 84 receives an inverted L-shaped bolt 87 slidably mounted in a generally C-shaped bracket 88 mounted on the outside of the railing section 62 at the inner end thereof. The bracket 88 is mounted on a plate 90 connected to the post 67 and the bottom rail 73 of the section 62. A spring 91 is mounted on the bolt 87 for biasing the latter to the lower, locked position. The spring 91 is compressed between the top arm 92 of the bracket 88 and a pin 94 extending outwardly from the bolt 87 above the bottom arm 95 of the bracket 88. When the section 62 is rotated to a user or extended position perpendicular to the side 22 of the platform 2, the spring 91 forces the bottom end 97 of the vertical arm of the bolt 87 into the hole 85 to lock the section 22 in the extended, use position. By pulling up on the horizontal top arm 98 of the bolt 87, the spring 91 is compressed and the bolt 87 is withdrawn from the hole 85 so that the rail section 92 can be swung back to a collapsed or folded position (FIG. 3) against the side 22 of the platform 2.

Figure 12:
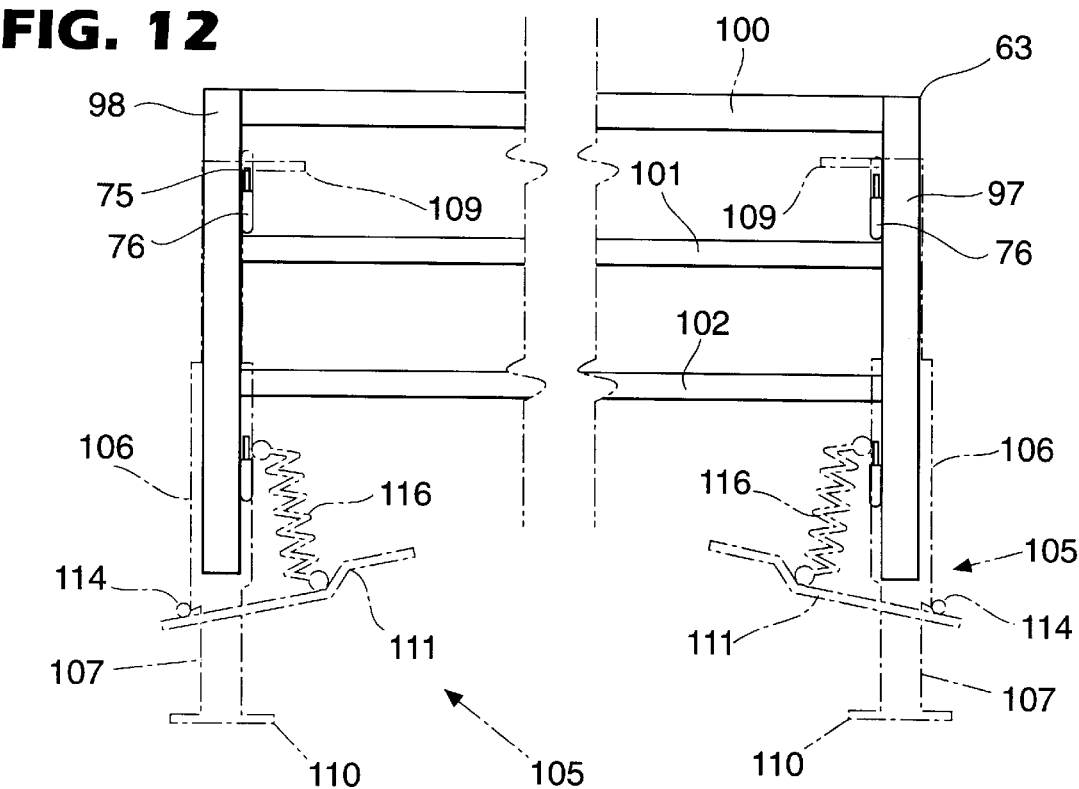
FIG. 12 is a front view of a second or intermediate rail section used in the assembly of FIGS. 1 to 3.

Referring to FIG. 12, each straight second or intermediate guardrail section 63 of rail includes end posts 97 and 98 interconnected by top, intermediate and bottom rails 100, 101 and 102, respectively. The post 97 at one end is connected to the post 68 of the first or innermost section 62 by hinges 76. A pair of retractable feet generally indicated at 105 are provided near the ends of each rail section 63.

Figure 14:
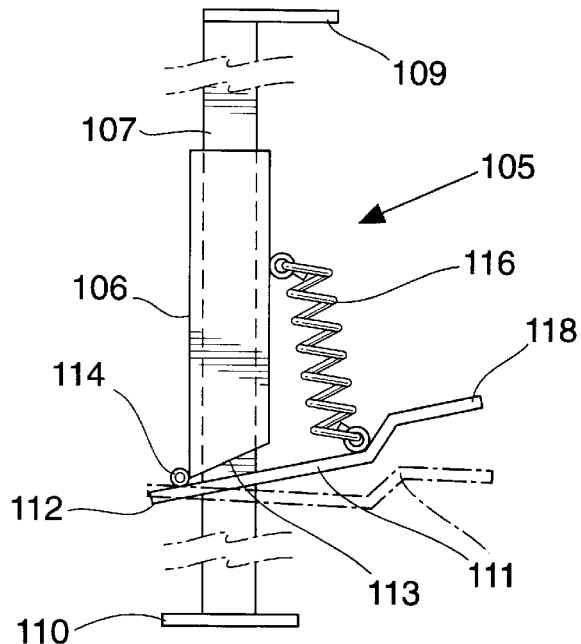
FIG. 14 is a side view of a leg used on the rail sections of FIGS. 12 and 13.

As best shown in FIG. 14, each foot 105 includes a square are cross section sleeve 106 welded to the outside of the section 63. A leg 1(7 is slidably mounted in the sleeve 106 for movement between a raised, non-use position and a lower, use position. A handle 109 is provided on the top end of the leg 107, and a pad 110 is mounted on the bottom end thereof. The leg 107 is maintained in the elevated position by a foot operated lever 111, one end 112 of which is pivotally connected to the inclined bottom end 13, of the sleeve 106 by a hinge 114. The lever 111 includes a hole (not shown), so that the leg 107 can slide in the lever when the lever is in the lower position shown in phantom outline in FIG. 14. The leg 107 is normally maintained in the raised or inclined locking position by a helical spring 116 extended between the lever and the sleeve 106. In the raised position, the inner and outer sides of the hole in the lever 111 grip the leg 107. When an operator steps on the inner end 118 of the lever 111, the latter pivots around the longitudinal axis of the hinge 114 to release the leg 107, whereby the leg drops into a lower position against the top 9 of the railcar 8. In order to raise the leg 107, the lever 111 is again depressed and the leg 107 is pulled upwardly using the handle 109. When the lever 111 is released, the lever 111 again engages the leg 107 to retain the latter in the elevated, non-use position.

Figure 13:
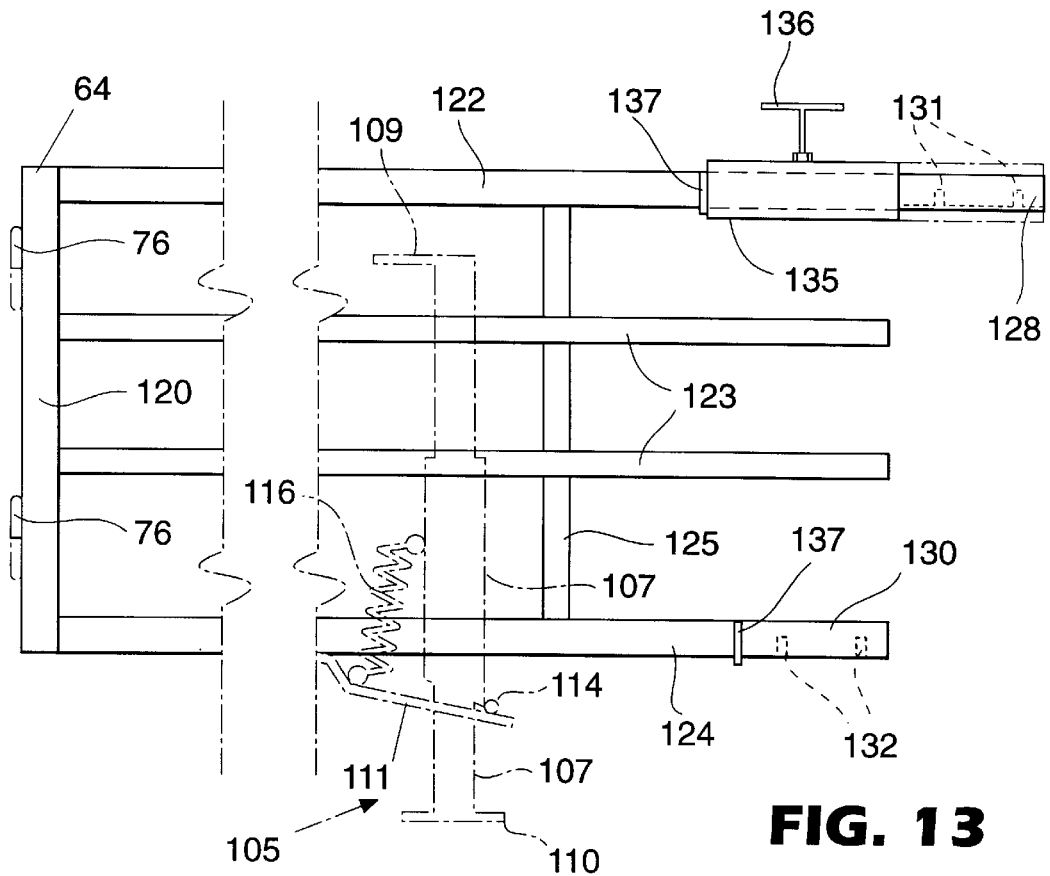
FIG. 13 is a front view of a third or outer rail section used in the assembly of FIGS. 1 to 3.

As best shown in FIG. 13, each of the outer rail sections 64 and 65 includes a post 120 pivotally connected to the post 98 in the outer end of the intermediate rail section 63 by hinges 76, and top, intermediate and bottom rails 122, 123 and 124 cantilevered outwardly therefrom. A reinforcing bar 125 extends between the rails 122, 123 and 124 near the outer free ends thereof. A foot 105 is provided on one of the outer rail sections 64 for supporting the outer end of the guardrail assembly in the extended, use position shown in solid lines in FIG. 8. As illustrated in FIGS. 3 and 6 to 8, the hinges 76 between the inner and intermediate rail sections 62 and 63 are on the inside of such sections, i.e. on the side of the assembly closest to the platform 2. Because the inner section 62 is L-shaped, in the collapsed condition of the guardrail assembly, there is a space between the rail sections 62 and 63. By mounting the hinges 76 connecting the intermediate and outer rail sections 64 and 65 on the inside of the intermediate rail sections, the outer rail sections 64 and 65 can be folded into such gap. The height of the outer sections 64 and 65 and the spacing between the rails 122, 123 and 124 is such that the outer section can be folded into the gaps between the inner and intermediate rail sections without the free ends of the rails 122, 123 and 124 interfering with the rails of the inner or intermediate rail sections 62 and 63.

A latch mechanism generally indicated at 127 in FIGS. 7, 8, 15 and 16 is provided on the outer free ends of the top and bottom rails 122 and 124 of each of the outer rail sections 64 and 65. The elements of the bottom latch mechanism 127 are reversed with respect to those of the top latch mechanism; however, the elements are the same and accordingly only those defining the top mechanism are described below. The top latch mechanism 127 includes a square cross section socket 128 on the free end 129 of one top rail 122 for receiving the square cross section, solid free end 130 of the other top rail 122. Pins 131 extend upwardly from the bottom of the socket 128 for entering recesses 132 in the free end 130 of the other top rail 122 when the latter is placed in the socket 128. A sleeve 135 is slidably mounted on the free end 129 of such one top rail 122 for movement between a release position shown in phantom outline in FIG. 16, and a locking position shown in solid lines in FIG. 16, in which the sleeve 135 covers the socket 128 to retain the free end 130 of the other top rail 122 in the socket. A T-shaped handle 136 on the top of the sleeve 135 facilitates manual movement of the sleeve. Flanges 137 on the top rails 122 limit movement of the sleeve 135 between the open or release position and the locking position.

Because the sections 62, 63, 64 and 65 of the guardrail assembly cantilever from the front corners of the platform 2, ledges 140 are provided on the sides of the base 14 for supporting the sections in the collapsed or folded position (FIG. 3). Each ledge 140 (FIGS. 4 and 11) has an inverted L-shaped cross section, and includes an outwardly tapering vertical arm 141 and a rectangular top arm 143 with a rubber pad 144 thereon.

Figure 18:
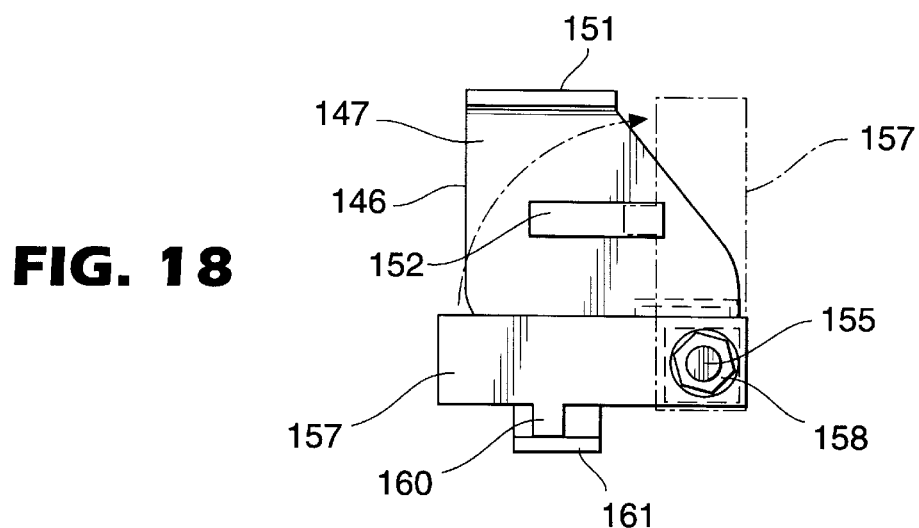
FIG. 18, which appears on the same sheet as FIG. 14, is a plan view of the assembly cradle of FIG. 17.
Figure 19:
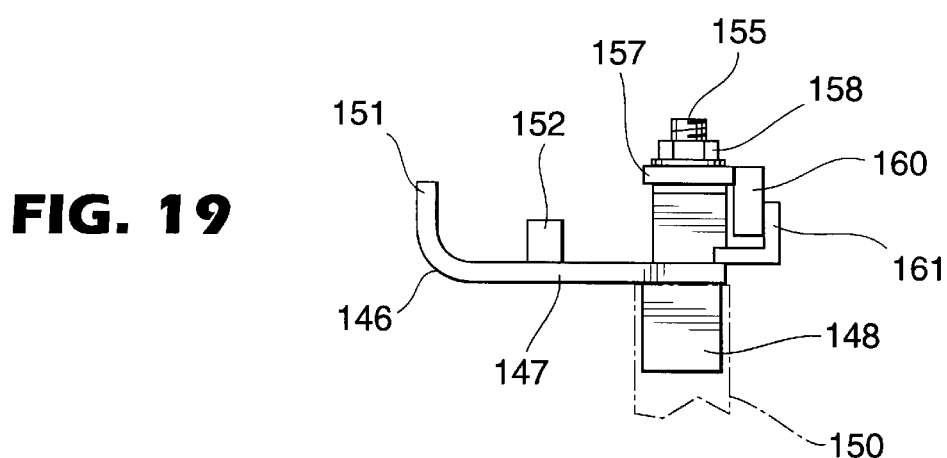
FIG. 19, which appears on the same sheet as FIG. 14, is a side view of the cradle of FIGS. 17 and 18.
Figure 15:
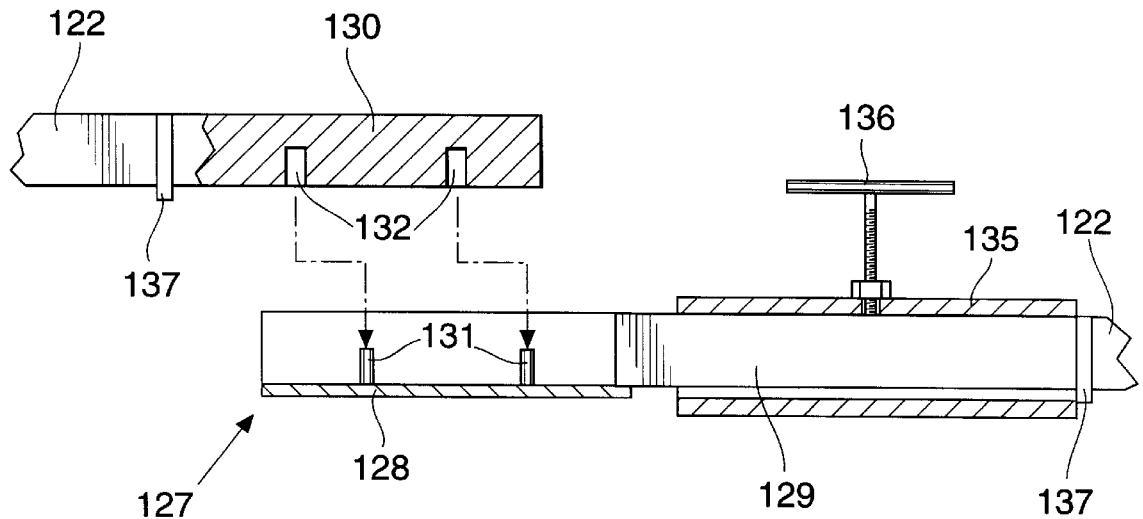
FIG. 15 is an exploded, longitudinal sectional view of a second latch mechanism used in the guardrail assembly of FIGS. 1 to 3.
Figure 16:
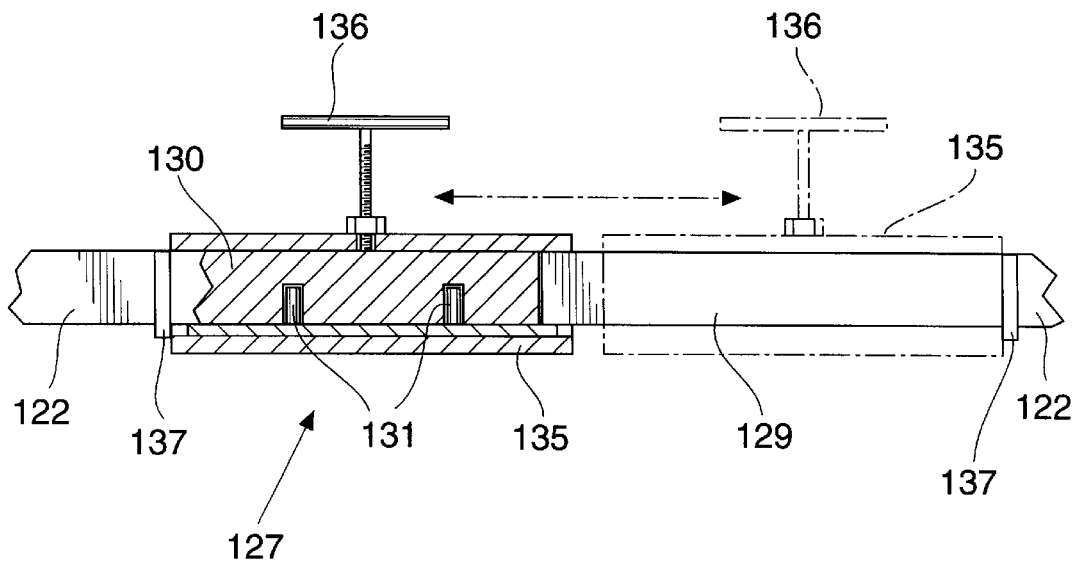
FIG. 16 is a longitudinal sectional view of the latch mechanism of FIG. 15.
Figure 17:
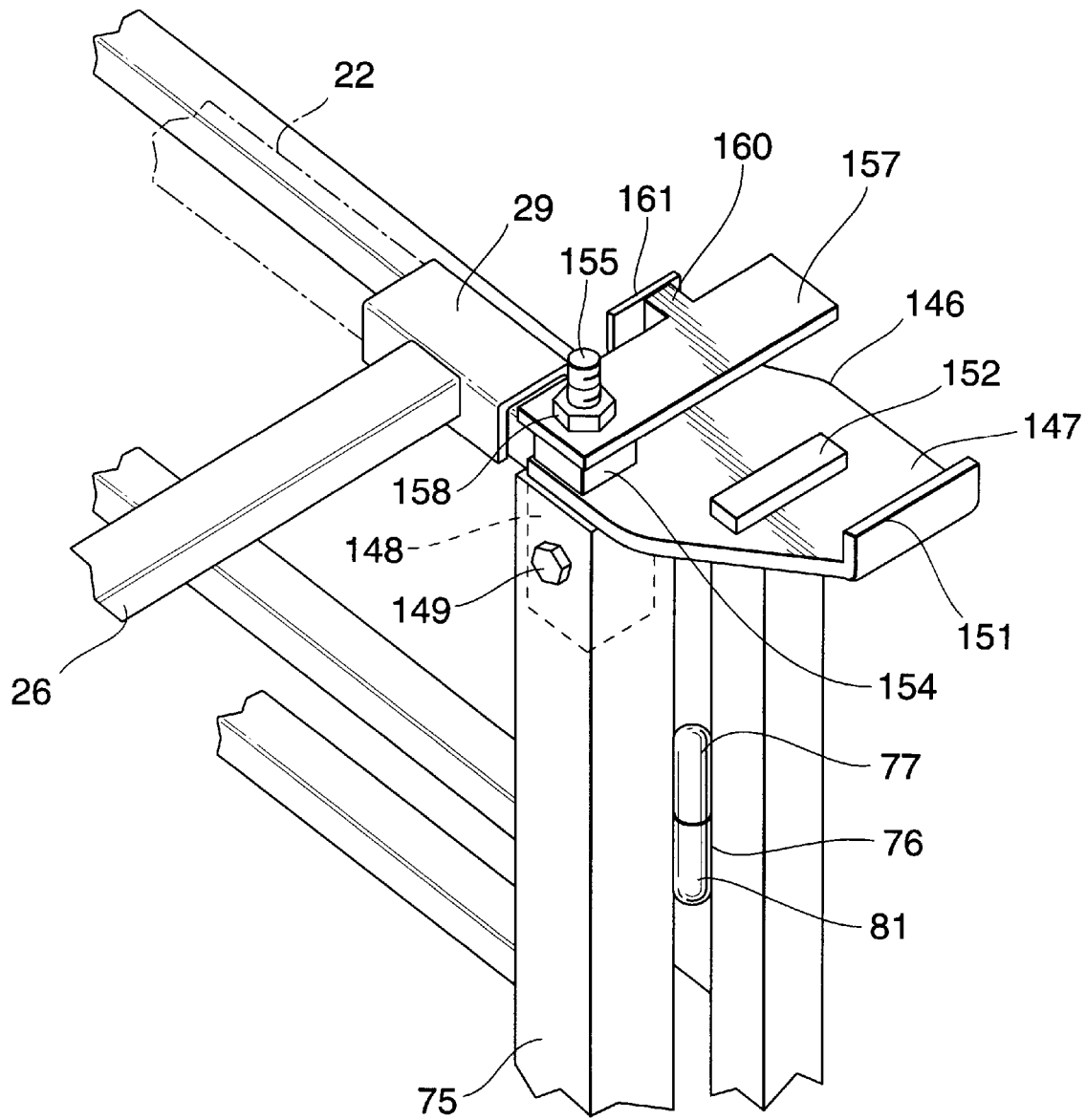
FIG. 17 is an isometric view of another front corner of the platform of FIGS. 1 to 3 and an assembly cradle.

During extension of the guardrail assembly to the use position shown in solid lines in FIG. 8, the free ends 129 and 133 of the outer sections 64 are temporarily supported by assembly cradles 146 (FIGS. 17 to 19). The assembly cradles 146 include a plate 147 with a short post 148 extending downwardly from one corner thereof for insertion into the post 75 (FIG. 17) defining the front corner of the side railing 22 of the platform 2. A bolt 149 (FIG. 17) extends through aligned holes in the posts 75 and 148 to connect the posts together. A flange 151 on the outer end of the plate 147 and a short bar 152 spaced apart therefrom define the sides of a recess for receiving the free end 129 or 130 of the top rail 122 of the outer rail section 65. This completes the description of one of the cradles 146 (the one on the right in FIGS. 3 and 6 to 8 when standing on the platform). As illustrated in FIGS. 18 and 19, the other cradle 146 (on the left in FIGS. 3 and 6 to 8) includes a top post 154 above the corner post 148 with a bolt 155 extending upwardly therefrom. One end of an arm 157 is pivotally mounted on the bolt 155 using a nut 158. The arm 157 is rotatable between an open position (shown in FIG. 17) and a closed position (shown in phantom outline in FIG. 18) in which the arm 157 holds the free end 130 of the top rail 122 on the cradle 146. With the free end of one rail section 64 stabilized in this manner, the other section 65 can be connected to the stabilized section and the sleeve 135 slid to the locked position. A lug 160 extends downwardly from the arm 157 for engaging an L-shaped stop 161 on the rear or inner end of the plate 147 which limits rotation of the arm 157 on the bolt 155. In the folded or collapsed position (FIG. 3) the rail sections 62, 63, 64 and 65 are held together by a chain (not shown). When the platform 2 has been maneuvered into position with the feet 30 on the top 9 of the railcar, the chain is removed to release the rail sections. The sections are pivoted outwardly away from the sides of the platform 2 (FIG. 6) to form a triangle on each side of the platform (FIG. 7). The free ends of the top rails 122 of the outer rail sections 64 and 65 are placed on the assembly cradles 146, and the lever 157 is rotated into the latch position to stabilize the rail section 64. With the rail section 64 stabilized, portions of the latch mechanism 127 on the free ends of the top and bottom rails of the rail section 65 can be properly connected to the corresponding elements on the free ends of the rail section 64. The latches 127 are closed, i.e. the sleeves 135 are slid to the closed position, and the latch arm 157 on the cradle 146 rotated to the open position. the rail sections 64 and 65 are then lifted from the cradles 16 and moved to the extended position (FIG. 8) to define a rectangular safety enclosure around a large work area on the railcar roof 9. Once the rail sections 62, 63, 64 and 65 have been fully extended, the operator steps on the lever 111 of the feet 105 to stabilize the assembly on the railcar. In order to return the rail sections 62, 63, 64 and 65 to the collapsed position, the procedure described above is reversed.

Thus, there has been described a relatively simple guardrail assembly for use on an aerial platform. Because the rail sections defining the assembly are skeletal, the assembly is relatively lightweight and consequently easy to manipulate.

We claim:

1. A work platform and guardrail assembly for work on an elevated work surface, comprising a mobile platform movable into a position adjacent the elevated work surface, said platform including a railing fixed therearound with an opening in the railing at one side of the platform to permit access to the elevated work surface from said one side of the platform two pluralities of rail sections pivotally connected to the platform railing on respective sides of said opening each plurality being movable from a first position collapsed against a respective side of the platform railing and a second position extended about the work surface to define a portion of a rail assembly around said work surface, each said plurality of rail sections having a free end which is remote from the railing in the second position; and first latch means for releasably interconnecting the free ends of the respective rail sections in the extended position to define a temporary safety enclosure that will extend completely around the work surface.

2. The assembly of claim 1, wherein each said plurality of rail sections includes a first section pivotally connected at a first end to the platform at one side of the opening for defining a first side of the enclosure substantially coplanar with the platform opening.

3. The assembly of claim 2, wherein each said plurality of rail sections includes a second rail section pivotally connected at a first end to a second end of said first section for defining an end of the enclosure perpendicular to one said first section and to the opening in the platform.

4. The assembly of claim 3, wherein each said plurality of rail sections includes a third rail section pivotally connected at a first end to a second end of said second rail section for defining a second side of the enclosure parallel to said first section and to the opening in the platform, said third rail section carrying said first latch means on second free ends thereof for completing the enclosure.

5. The assembly of claim 4, including ledge means extending outwardly from the bottom of said platform for supporting each said plurality of rail sections in the collapsed position.

6. The assembly of claim 4, wherein said first latch means includes socket means on a said second, free end of one said third rail section of one said plurality of rail sections for receiving a second, free end of third rail section of the other plurality of rail sections; and sleeve means slidable on one said second, free end of the third rail sections for retaining said free end of the said second end of the third section in said socket means.

7. The assembly of claim 4, including leg means on at least some of said first, second and third rail sections for supporting said safety enclosure on said elevated work area.

8. The assembly of claim 7, wherein said leg means are extensible for movement between elevated, storage positions and lower, use positions on the work area.

9. The assembly of claim 8, including second latch means for releasably locking said leg means in elevated positions.

10. The assembly of claim 8 including cradle means mounted on a front end of each side of said platform for supporting the free ends of each said plurality of rail sections during movement from the collapsed to the extended positions.

11. The assembly of claim 10, wherein said cradle means includes third latch means for releasable retaining the free end at least one of said plurality of rail sections during interconnection of said free ends.

12. The assembly of claim 11, including fourth latch means for releasably latching said pluralities of rail sections in the extended position.

* * * * *